United States Patent
Wickert et al.

(10) Patent No.: US 6,794,766 B2
(45) Date of Patent: Sep. 21, 2004

(54) METHOD AND OPERATIONAL STRATEGY FOR CONTROLLING VARIABLE STATOR VANES OF A GAS TURBINE POWER GENERATOR COMPRESSOR COMPONENT DURING UNDER-FREQUENCY EVENTS

(75) Inventors: Thomas Edward Wickert, Simpsonville, SC (US); Bryan Edward Sweet, Valatie, NY (US)

(73) Assignee: General Electric Company, Schenectady, NY (US)

( * ) Notice: Subject to any disclaimer, the term of this patent is extended or adjusted under 35 U.S.C. 154(b) by 58 days.

(21) Appl. No.: 09/893,608

(22) Filed: Jun. 29, 2001

(65) Prior Publication Data

US 2003/0011199 A1 Jan. 16, 2003

(51) Int. Cl.[7] .............................................. F01D 15/10
(52) U.S. Cl. ...................................................... 290/52
(58) Field of Search ................................ 290/52, 40 C, 290/40 R; 417/319; 60/783, 772

(56) References Cited

U.S. PATENT DOCUMENTS

| | | | | |
|---|---|---|---|---|
| 4,077,748 A | * | 3/1978 | Potz ............................ | 417/319 |
| 4,242,592 A | * | 12/1980 | Yannone et al. .......... | 290/40 R |
| 4,327,294 A | * | 4/1982 | Smith et al. .............. | 290/40 C |
| 4,370,560 A | * | 1/1983 | Faulkner et al. .......... | 290/40 C |
| 4,430,043 A | | 2/1984 | Knight et al. | |
| 4,536,126 A | * | 8/1985 | Reuther ..................... | 290/40 R |
| 5,308,226 A | | 5/1994 | Venkatasubbu et al. | |
| 5,467,613 A | * | 11/1995 | Brasz ........................... | 62/402 |
| 5,740,673 A | * | 4/1998 | Smith et al. .................. | 60/783 |
| 5,748,500 A | * | 5/1998 | Quentin et al. ............. | 702/182 |
| 6,226,974 B1 | * | 5/2001 | Andrew et al. ............... | 60/772 |
| 6,378,305 B1 | * | 4/2002 | Sumser et al. ................ | 60/602 |
| 6,512,305 B1 | * | 1/2003 | Pinkerton et al. ............. | 290/52 |

* cited by examiner

*Primary Examiner*—Tran Nguyen
*Assistant Examiner*—Julio Gonzalez
(74) *Attorney, Agent, or Firm*—Nixon & Vanderhye PC

(57) ABSTRACT

A method is provided for controlling variable inlet and stator vanes of a heavy-duty gas turbine electrical power generator compressor component upon occurrence of power grid under-frequency events. Variable inlet guide vanes and the front four variable stator vanes of the compressor are ganged together by means of a common actuation mechanism. Altering the angle of the ganged vanes changes the overall airflow consumption of the compressor and affects the amount of turbine output power produced. Predetermined operational schedules for varying the angular position of the stator vanes in accordance with compressor speed are defined for both nominal and under-frequency operating conditions to ensure optimum compressor efficiency without violating minimum safe compressor surge margin criteria. During a power grid under-frequency event, the variable stator vanes of the compressor are operated in a manner that provides a smooth transition from the predetermined nominal operational schedule to the predetermined under-frequency operational schedule.

4 Claims, 3 Drawing Sheets

METHOD AND OPERATIONAL STRATEGY FOR CONTROLLING VARIABLE STATOR VANES OF A GAS TURBINE POWER GENERATOR COMPRESSOR COMPONENT DURING UNDER-FREQUENCY EVENTS

BACKGROUND OF THE INVENTION

The present invention relates to heavy duty industrial gas turbines used in electrical power generation, and in particular, to a method for operating a multi-stage axial flow compressor component of such turbines during power grid under-frequency events, and a strategy for transitioning between nominal and under-frequency operation schedules.

Large increases in the electrical power consumptive demand placed upon an electrical power distribution grid will tend to reduce the electrical operational frequency of the grid, causing an "under-frequency" event. For example, a heavy or sudden electrical demand may cause a particular power distribution grid having a nominal operational frequency of 50 Hz to momentarily operate at 49 Hz. In conventional electrical power generation systems that utilize one or more heavy-duty industrial gas turbine for supplying electrical power to the grid, the physical speed of each turbine supplying power to the grid is synchronized to the electrical frequency of the grid. Unfortunately, as the physical speed of a gas turbine decreases, other things being equal, its power output correspondingly decreases. Consequently, during an under-frequency event, a gas turbine will tend to output a lower power. In the past, a common practice in response to a power grid under-frequency event (occurrence) is to increase the firing temperature of the gas turbine to produce more power in an effort to maintain a predetermined level of output power. Unfortunately, such over-firing of the gas turbine results in drastically reducing the operational life expectancy of various hot gas path components within the turbine.

Although some heavy-duty gas turbines conventionally used for power generation have been known to incorporate variable inlet guide vanes, the use of variable stator vane in addition to variable inlet guide vanes has been relatively uncommon prior to the introduction of General Electric's H-Series Gas Turbines. Such variable stator vanes provide the ability to adjust airflow incidence angle (i.e., the difference between the air angle and the mean line angle at the compressor blade leading edge) in the front stages of the compressor so that an acceptable compressor surge-free operation margin may be maintained. Typically, maintaining surge-free operation is a vital critic-to-quality (CTQ) operational criterion of the compressor component for these types of gas turbines.

The inventors of the present invention recognized that the variable stator vanes could be used to modify the airflow volume consumed by the compressor component and, thus, modulate the output power produced by the gas turbine.

In one aspect, the present invention overcomes problems associated with over-firing of gas turbines equipped with variable stator vanes (blades) to compensate for power output during under-frequency events by utilizing the variable stator vanes to increase the amount of airflow consumed by the compressor component in a predefined manner so to preclude and/or minimize a decrease in the level of output power generated rig a grid under-frequency event. In another aspect, the present invention overcomes urge problems associated with increasing the power output of a gas turbine equipped with variable stator vanes by maintaining operation within a safe surge margin during the occurrence of a power grid under-frequency event. In a further aspect, the present invention overcomes potential operational problems that may occur as a result of switching between nominal operating conditions and power grid "under-frequency" operational conditions.

BRIEF SUMMARY OF THE INVENTION

Varying the angle of the inlet and stator vanes of the compressor component alters the overall airflow volume consumed by the compressor and affects the resultant turbine output power produced. The method of the present invention relates to gas turbine systems wherein one or more of the front variable stator vanes (VSV) of the compressor component are ganged together by means of a common actuation mechanism. Operational schedules for varying angular positions of the ganged stator vanes with respect to corrected physical compressor speed are defined for both normal and "under-frequency" power grid operating auditions to provide optimum compressor efficiency without violating minimum safe compressor surge margin criteria. A compressor operational method and strategy is provided for controlling the angular position of the ganged compressor vanes in a manner that ensures smooth transitions between nominal and under-frequency (or vice versa) operational schedules during and/or subsequent to the occurrence of power grid under frequency events.

BRIEF DESCRIPTION OF THE DRAWINGS

These and other features and advantages provided by the invention would be better and more completely understood by referring to the following detailed description of presently preferred embodiments in conjunction with the drawings of which.

DETAILED DESCRIPTION OF THE INVENTION

In a multi-stage axial flow compressor for a heavy-duty industrial gas turbine used for power generation, the variable inlet guide vanes (IGVs) and one or more variable stator vanes (e.g., the front four stator vanes) are ganged together on each side of the compressor component by means of a common actuation mechanism (not shown). In this example, one stator (S2) of the front four variable stator vanes (S1, S2, S3 and S4) is designated as a reference vane for use in positioning the entire gang of stator vanes.

Figure 1:
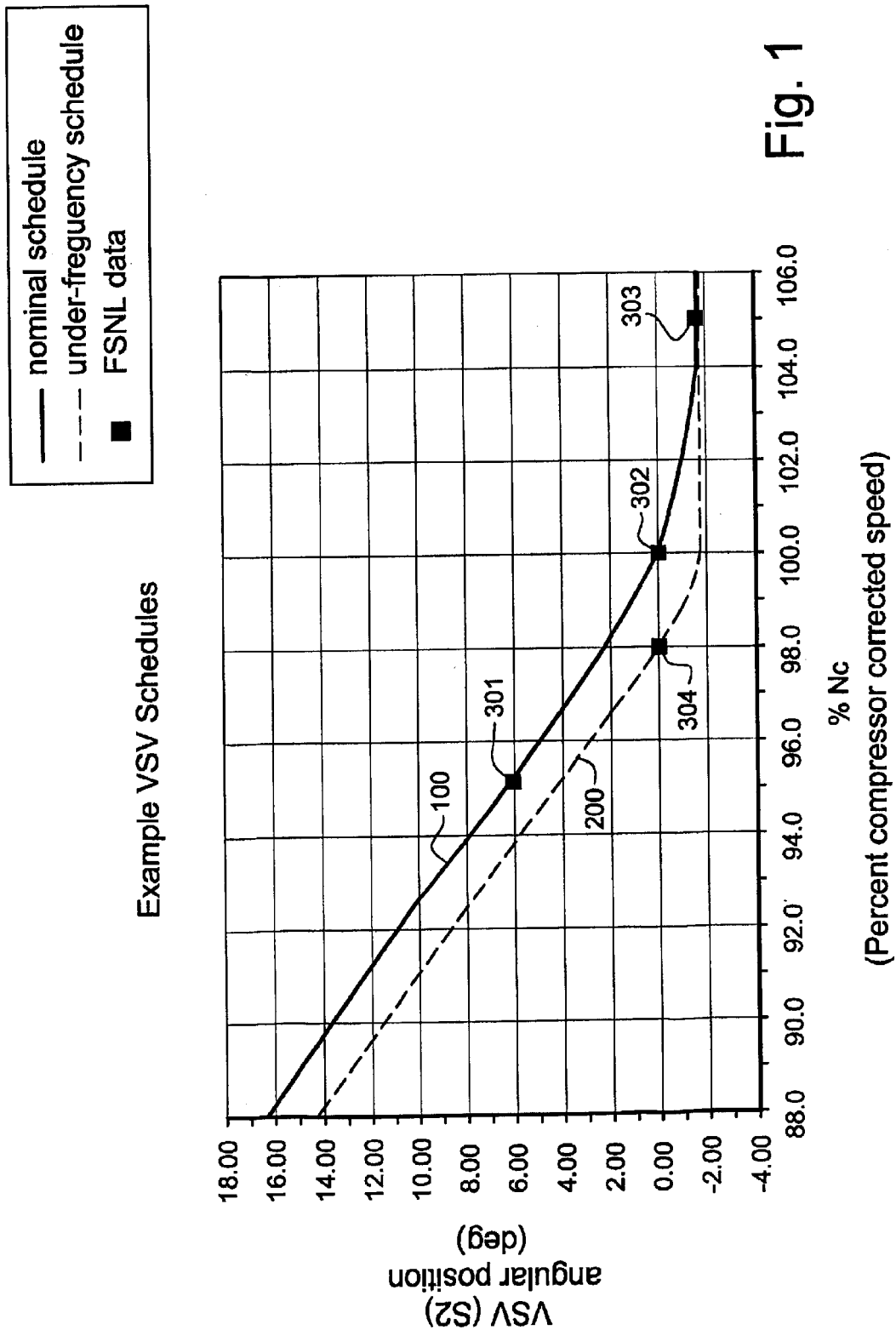
FIG. 1 is a graphical plot illustrating example nominal and under-frequency operational schedules for controlling the angular position of compressor stator vanes with respect to the speed of the compressor component of the gas turbine.

Initially, as illustrated in FIG. 1, a nominal variable stator vane (VSV) position control schedule 100 (solid line) is defined in an effort to optimize compressor efficiency and airflow. Such optimization may be empirically established, for example, during the course of a scaled compressor component test. An "under-frequency" variable stator vane (VSV) schedule, as indicated by dotted line 200 in FIG. 1, is also defined using, for example, the results of off-design performance modeling of the compressor component.

For the example schedules illustrated in FIG. 1, a smaller positive angular position value corresponds to an increase in the opening of the variable stator vanes. In a preferred example embodiment, under-frequency VSV schedule 200 is defined so as to provide an increase in gas turbine output power while still providing an adequate surge margin for the compressor taking into consideration a decrease in compressor surge margin that results from opening the variable stator vanes beyond the nominal schedule.

The ganged variable compressor vane actuation mechanism may, for example, be computer controlled using the same computerized controller that is typically used to control the overall operation of the turbine. Alternatively, a dedicated programmable controller may be used. One of ordinary skill in the art will appreciate that the example VSV control schedules may be readily implemented through the application of conventional programming techniques as used for such control systems, as is well known in the art. For example, the authoring of simple program control code for instructing a computer controlled actuation mechanism so as to alter compressor vane position in response to a monitored (or computed) compressor speed value according to a predetermined schedule, such as depicted in FIG. 1, may be readily accomplished without undue experimentation by a programmer of ordinary skill in this art. Accordingly, the details of example controller program code for implementing a particular VSV schedule is not discussed herein.

Under ordinary operating conditions at "base load" (i.e., the expected maximum power demand or greatest expected power load under otherwise normal conditions), the ganged inlet and stator vanes of the compressor are operated according to nominal schedule 100, defined well within a safe "surge" margin for operation of the compressor. (Beyond this surge margin, turbine operation may become unstable.) However, during an under-frequency event, it is more desirable to operate the compressor according to a predetermined under-frequency schedule (200), distinct from nominal schedule 100, which increases airflow consumption so as to improve power output of the turbine while still maintaining an adequate safe surge margin for the compressor component.

As noted from example graphical plots of the nominal and the under-frequency operational schedules illustrated in FIG. 1, there is a significant difference between vane angle position settings corresponding to a particular physical compressor speed ($N_{phys}$) between nominal schedule 100 and under-frequency schedule 200. Example test points derived from empirical data are shown for various stator vane positions and compressor speed. Data points 301, 302 and 303 are indicative of compressor operational points along nominal VSV positioning schedule 100 for an example compressor running under full speed no-load (FSNL) conditions. Data point 304 is indicative of an operational point along the defined under-frequency positioning schedule.

The present invention provides a method for implementing a compressor operational strategy for a gas turbine which will, upon the occurrence of a power grid under-frequency event, control the variable inlet and stator vanes of the compressor component to smoothly transition from a nominal operational schedule to a predetermined under-frequency operational schedule in a manner that is dependant upon physical speed, $N_{phys}$, of the compressor. More specifically, a conventional computerized controller (not shown) for the turbine is programmed to control a compressor vane actuation mechanism in accordance with the following preferred example operational strategy:

For $N_{phys} \geq 100\%$, the variable inlet and stator vanes (VSVs) follow the nominal schedule (i.e., the solid line in FIG. 1);

For $N_{phys} \leq 99\%$, the VSVs follow the under-frequency (schedule i.e., dotted line in FIG. 1); and for $99\% < N_{phys} < 100\%$, the VSVs are linearly transitioned between the nominal schedule and the under-frequency schedule.

Figure 2:
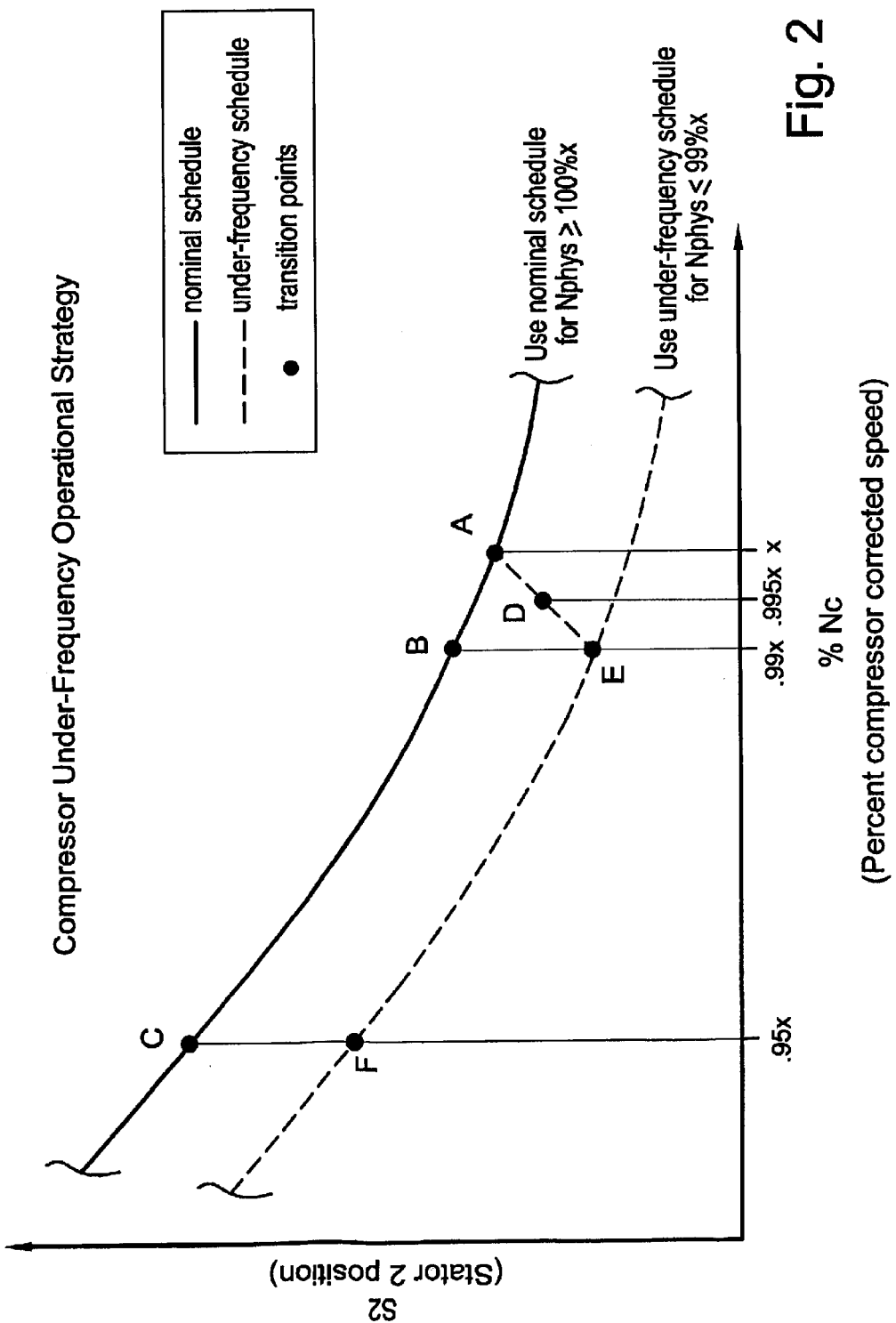
FIG. 2 is a detailed graphical plot of an operational strategy for transitioning between nominal and under-frequency stator position control schedules.
Figure 3:
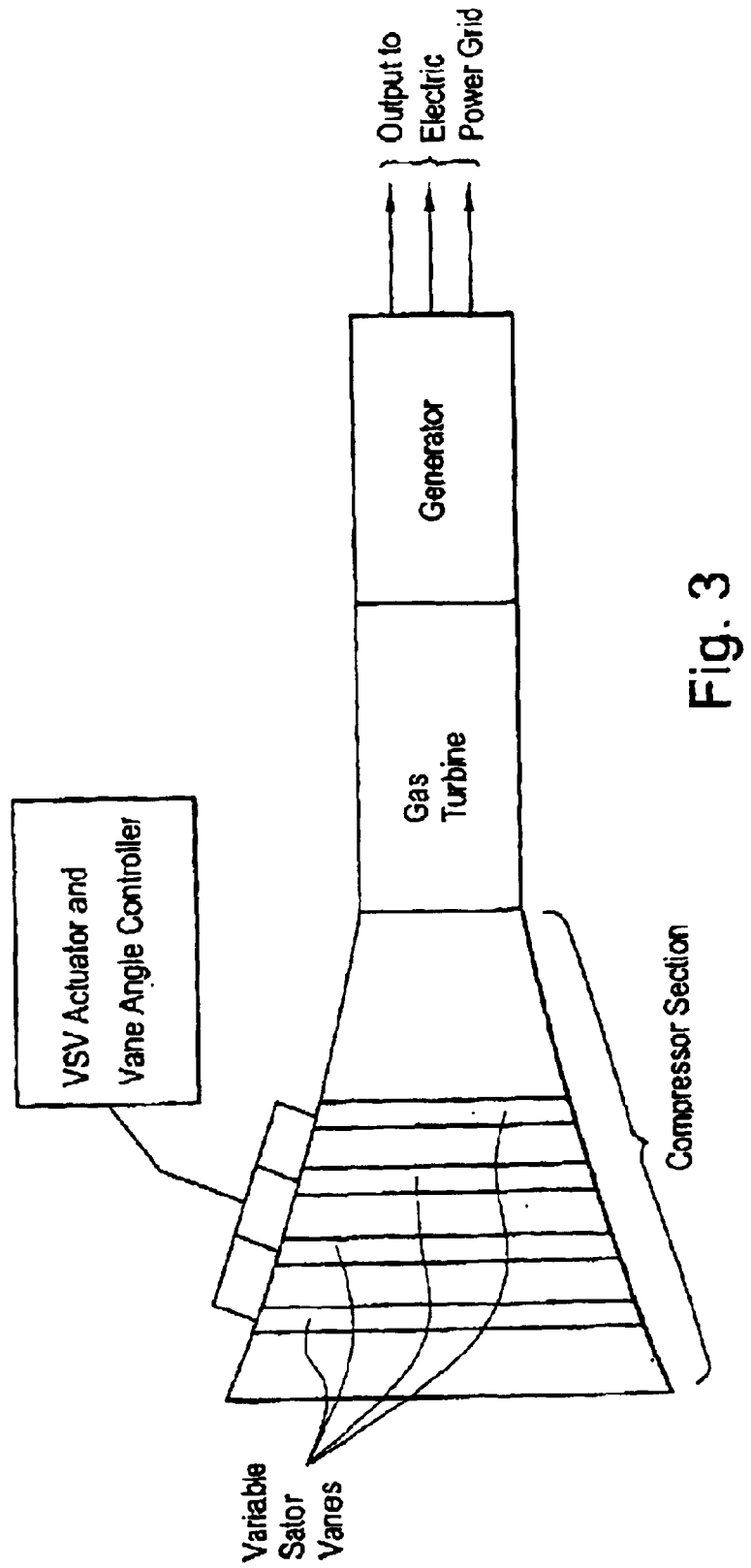
FIG. 3 is a block diagram illustrating an example gas turbine system having a compressor component, variable stator vanes, a variable stator vane (VSV) actuator vane angle controller, and generator output to an electric power grid.

For the above and following examples, as illustrated by FIG. 1 and FIG. 2, compressor corrected speed (in RPM), $N_C$, is related to the compressor physical speed (in RPM), $N_{phys}$, by the following relationship:

$$N_C = \frac{Nphys}{\sqrt{\frac{T_{inlet}}{519}}}$$

Where, $T_{inlet}$=compressor inlet air temperature (R).

For example, referring now to FIG. 2, at operational point A the gas turbine may be operating at 100% physical speed and the VSVs are positioned on the nominal schedule. If there were no under-frequency schedule in effect, as the grid frequency dropped, the VSV controller would track the nominal schedule as follows:

When physical speed of the gas turbine drops from 100% to 99%, vane position value changes along the nominal schedule from A→B; and when physical speed of the gas turbine drops from 99% to 95%, vane position value changes along the nominal schedule from B→C.

With a pre-defined under-frequency schedule in effect, the VSV controller is programmed to follow a smooth transition from the nominal schedule to the under-frequency schedule as the power grid frequency drops:

When physical speed of the gas turbine drops from 100% to 99.5%, vane position value changes toward the under-frequency schedule from A→D;

when physical speed of the gas turbine drops from 99.5% to 99%, vane position value changes toward the under-frequency schedule from D→E; and when physical speed of the gas turbine drops from 99% to 95%, vane position value changes along the under-frequency schedule from E→F.

As the power grid frequency recovers, the VSV controller is programmed to smoothly transition from the under-frequency schedule back onto the nominal schedule in reverse order of the above:

F→E→D→A

In an example under-frequency test (see, again, FIG. 1), compressor performance obtained at 98.06% $N_C$ while operating on the under-frequency schedule (i.e., 98.06% $N_C$ with S2=0.0° at test point 304) provided an airflow consumption increase of 3.4% over that which would have been obtained using the nominal schedule (100), which specifies a stator vane position of 2.1°.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a gas turbine electric power generator wherein a rotational speed of the turbine is synchronized to the electrical frequency of a power grid, the turbine having a compressor component having one or more variable position stator vanes, a actuating mechanism for changing the angular position of the stator vanes and a controller for controlling the actuating mechanism, a method of implementing a compressor operational strategy for controlling the output power produced by the gas turbine, comprising:

controlling an angular position of the stator vanes in accordance with a predetermined nominal vane positioning schedule during ordinary base load power grid operational conditions;

during a onset of a power grid under-frequency condition, providing a gradual change in angular position of the stator vanes with respect to compressor physical speed from operating according to the predetermined nominal vane positioning schedule to operating according to a predetermined under-frequency vane positioning schedule; and varying the angular position of the stator vanes in accordance with the predetermined under-frequency vane positioning schedule during the power grid under-frequency condition;

wherein the gradual change in angular position of the stator vanes during a transition in operation from the nominal vane positioning schedule to the predetermined under-frequency vane positioning schedule is substantially linear with respect to a change in turbine compressor speed.

2. A method of controlling the output power of a gas turbine as set forth in claim 1 further comprising the step of:

during a transition of power grid operational conditions from an under-frequency condition to ordinary base load operating conditions, providing a gradual change in angular position of the stator vanes with respect to compressor speed during a transition in operation from the predetermined under-frequency vane positioning schedule to the predetermined nominal vane positioning schedule.

3. A method of controlling the output power of a gas turbine as set forth in claim 2 wherein the gradual change in angular position of ganged inlet/stator vanes during a transition in operation from the predetermined under-frequency vane positioning schedule to the predetermined nominal vane positioning schedule is substantially linear with respect to a change in a compressor physical speed, Nphys.

4. A method of controlling the output power of a gas turbine as set forth in claim 1 wherein the angular position of the stator vanes is varied with respect to compressor corrected speed, $N_c$, according to the following relationship:

$$N_C = \frac{Nphys}{\sqrt{\frac{T_{inlet}}{519}}}$$

where Nphys is the compressor physical speed and $T_{inlet}$ = compressor inlet air temperature.

* * * * *

UNITED STATES PATENT AND TRADEMARK OFFICE
CERTIFICATE OF CORRECTION

PATENT NO. : 6,794,766 B2
DATED : September 21, 2004
INVENTOR(S) : Wickert et al.

It is certified that error appears in the above-identified patent and that said Letters Patent is hereby corrected as shown below:

Column 1,
Line 49, change the word "operation" to the word -- operational --
Line 50, change the word "critic" to the word -- critical --
Line 62, after the word "so" insert the word -- as --
Line 64, delete the word "rig" and insert the word -- during --
Line 65, change the word "urge" to the word -- surge --

Column 2,
Lines 19 and 20, delete the word "auditions" and insert the word -- conditions --
Line 46, after the word "actuator" insert the word -- and --

Column 5,
Lines 8 and 17, change the word "a" to the word -- an --

Signed and Sealed this

First Day of February, 2005

JON W. DUDAS
*Director of the United States Patent and Trademark Office*

UNITED STATES PATENT AND TRADEMARK OFFICE
CERTIFICATE OF CORRECTION

PATENT NO.        : 6,794,766 B2                                   Page 1 of 1
APPLICATION NO. : 09/893608
DATED             : September 21, 2004
INVENTOR(S)       : Wickert et al.

It is certified that error appears in the above-identified patent and that said Letters Patent is hereby corrected as shown below:

In Column 1, immediately below the title, insert:

--The Government of the United States of America has rights in this invention pursuant to Contract No. DE-FC21-95MC31176 awarded by the U.S. Department of Energy.--

Signed and Sealed this

Twenty-seventh Day of February, 2007

JON W. DUDAS
*Director of the United States Patent and Trademark Office*